(No Model.)

J. L. KIRKPATRICK.
CHUCK.

No. 357,394.　　　　　　　　　　Patented Feb. 8, 1887.

WITNESSES:
H. C. Bliss
J. W. Kennely

INVENTOR
James L. Kirkpatrick
BY Allen Webster
ATTORNEY

UNITED STATES PATENT OFFICE.

JAMES L. KIRKPATRICK, OF SPRINGFIELD, MASSACHUSETTS.

CHUCK.

SPECIFICATION forming part of Letters Patent No. 357,394, dated February 8, 1887.

Application filed June 30, 1885. Serial No. 170,240. (No model.)

*To all whom it may concern:*

Be it known that I, JAMES L. KIRKPATRICK, a citizen of the United States, residing in Springfield, Hampden county, Massachusetts, have invented new and useful Improvements in Apparatus for Polishing or Stoning Watch-Movements, of which the following is a specification, reference being had to the accompanying drawings.

Heretofore the parts which were required to be stoned have been treated by hand. This is objectionable because of being slow, unreliable, and expensive, and an attempt has been made, which to some extent has been found practicable, to stone the parts by machinery, the parts to be operated upon being grasped rigidly in a chuck at or near its center and revolved rapidly while the polishing-stone was applied to the face. This is found objectionable, for the reason that, the material being revolved on a center, the portion of its surface which is nearest the center of revolution will be subjected to less wear than the portions farthest from the center; hence an even and level surface will not be left, and if the operative fail to adjust the material in the chuck with perfect accuracy the portion projecting farthest will be cut away and the material will be injured.

The object of my invention is to provide means to readily hold the material without injury while being rapidly treated.

My invention consists in providing a chuck having a loose holding means, and adapted to hold more than one piece.

My invention further consists in a chuck having an elastic or yielding facing.

Figure 1:
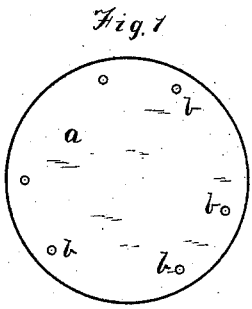
Figure 2:
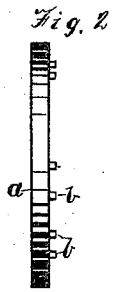
Figure 3:
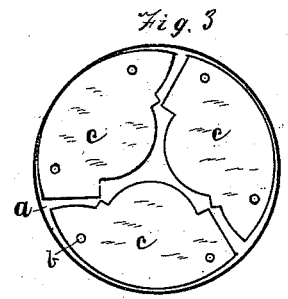
Figure 4:
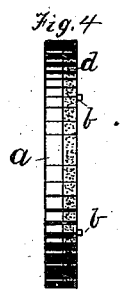
Figure 5:
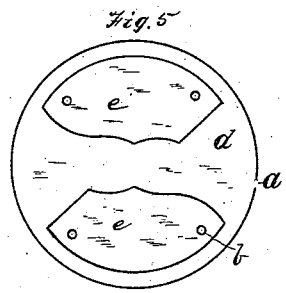
Figure 6:
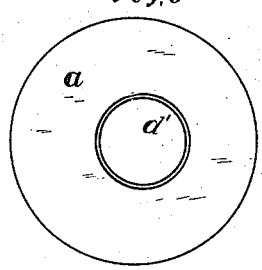
Figure 7:
Figure 8:
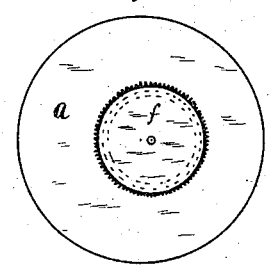
Figure 9:
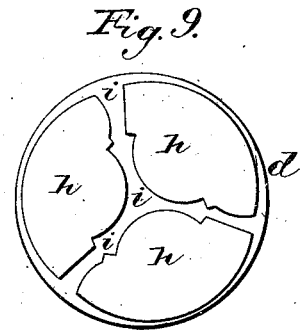

In the accompanying drawings, in which like letters of reference indicate like parts, Figure 1 is a face view of one of the simplest forms of chuck devised by me to accomplish the desired result. Fig. 2 is an edge view of the same; and Fig. 3, a face view of the same, having three pieces, $c$, of material in place to be operated upon. Fig. 4 is an edge view of the chuck having a yielding or elastic facing, $d$; and Fig. 5 is a face view of the same, showing two pieces of material, $e$, in place. Figs. 6 and 7 are face and edge views of a chuck having an elastic holding-piece, $d'$, which supports and holds the material being operated upon. Fig. 8 is a view of the same with a watch-barrel, $f$, in place; and Fig. 9 is a face view of a chuck-plate, $a$, having holding projections, $i$, made by sinking recess $h$ in the plate $a$ of a shape of the material $c$. (Shown in Fig. 3.)

The construction will be readily understood upon referring to the drawings.

A plate or disk, $a$, is preferably provided with pins or projections $b$, which enter openings or notches in the material to be treated. The pins should be so disposed and of such size as to permit of the quick adjustment of the material; or, if preferred, the reverse method may be resorted to—*i. e.*, a recess may be sunk in the face of the chuck, the recess being substantially of the shape of the material to be treated. The loose holding of the material allows it to cant slightly, or, in other words, to give before the polishing-stone, thus resulting in the polishing of the whole surface without wearing it away in spots, as would result were the material held rigidly in place. To still further utilize this principle, I for the finishing and finer grade of work construct the face of the chuck of a yielding or elastic substance, preferably supplying a piece of soft rubber, $d$, as shown in Figs. 4 and 5. This allows the application of the polishing-stone without danger of wearing away one part of the surface which projects more than another, as the material will under pressure give before the stone, the soft backing $d$ allowing the material to retreat, thus preventing undue wear.

To still further enable me to avoid a possible unequal wear or polish and to facilitate the performance of the work, I construct the chuck so that more than one piece may be held and operated upon at the same time. This I do by disposing the parts around the center.

I am aware that an attempt has heretofore been made to polish small material by holding them rigidly in the center of the chuck. The objections to this are twofold: first, as before stated, the utmost accuracy is required in setting the piece to prevent a projecting portion being worn away, and, second, as the center portion passes through less space in a revolution, the center being practically a dead point, or nearly so, it is found in practice that a projection is left in the center, while the portion around it is worn away.

It will readily be seen that very many modifications may be made in the construction and application of my invention, and I do not limit myself to the exact construction shown.

It will be noticed that in each of the illustrations the method resorted to to hold the material to be operated upon to the chuck is projections which extend from the plate *a* outward, and either enter openings in the material to be treated or so come in contact with it upon the outside as to hold it loosely in place. In Figs. 1, 2, and 3 the projections are pins, which enter loosely in the holes in the material *c*. In Figs. 4 and 5 the same mechanism is resorted to—to wit, pins *b* project and hold the material; and in addition, for the purposes of further utilizing the principle discovered by me, I provide a yielding backing, *d*, which intervenes between the plate *a* and the material to be treated, and in Figs. 6, 7, and 8 a projection, *d'*, extends from the plate *a*, and instead of the yielding backing being independent of and at the base of the projection it is made a part of it—*i. e.*, the projection itself is made yielding—thus utilizing the same principle and adapting it to a differently-shaped piece of material.

In Fig. 9 the projection, instead of entering recesses in the material, projects around the material; but in no case do the projections hold the material firmly in place, but allow the material to cant or tip slightly under pressure.

By illustrating the method or process herein described and failing to claim the same I do not abandon my claim to obtain Letters Patent thereon; but it is my intention to obtain Letters Patent therefor by application to be filed before the issue hereof.

Having therefore described my invention, what I claim, and desire to secure by Letters Patent, is—

1. An apparatus for stoning watch-movements, consisting of a revolving plate adapted to hold the parts to be operated upon loosely in place by projections which extend from the face of the revolving plate, substantially as shown.

2. A chuck for stoning watch-movements, consisting of a revolving plate having pins projecting from its face engaging the material to be treated and holding the same loosely, substantially as shown.

3. A chuck for stoning watch-movements, consisting of a revolving plate having a means, as projections, to hold the material loosely in place, and having a yielding backing interposed between the material and plate, substantially as shown.

4. A chuck for stoning watch-movements, having a series of projections to hold the material loosely in place away from the center of revolution, substantially as shown.

JAMES L. KIRKPATRICK.

Witnesses:
ALLEN WEBSTER,
J. W. KENNELY.